US005160775A

United States Patent [19]

Yamada

[11] Patent Number: 5,160,775

[45] Date of Patent: Nov. 3, 1992

[54] ANTISTATIC MAT

[75] Inventor: Kohei Yamada, Hashima, Japan

[73] Assignee: Daiwa Company, Ltd., Gifu, Japan

[21] Appl. No.: 634,420

[22] Filed: Dec. 27, 1990

[30] Foreign Application Priority Data

Jun. 17, 1990 [JP] Japan .................................. 2-158276

[51] Int. Cl.[5] ......................... B32B 3/02; B32B 33/00; B32B 27/14

[52] U.S. Cl. ......................................... 428/95; 428/85; 428/97; 428/198; 428/922

[58] Field of Search ..................... 428/85, 97, 95, 922, 428/198

[56] References Cited

U.S. PATENT DOCUMENTS

| | | | |
|---|---|---|---|
| 2,302,003 | 11/1942 | Cadwell et al. | 428/85 |
| 3,955,022 | 5/1976 | Sands | 428/95 |
| 4,269,881 | 5/1981 | Johnson et al. | 428/95 |
| 4,756,941 | 7/1988 | McCullough et al. | 428/97 X |
| 4,770,916 | 9/1988 | Leukel et al. | 428/95 |
| 4,857,377 | 8/1989 | Daimon et al. | 428/97 X |
| 4,913,952 | 4/1990 | Fowler | 428/95 X |

FOREIGN PATENT DOCUMENTS

| | | | |
|---|---|---|---|
| 1-06450 | 4/1990 | Japan | 428/922 |

OTHER PUBLICATIONS

Rubber Age (N.Y.); "Nullifying Static Electricity in Rugs and Carpets"; p. 228, Dec. 1942.

*Primary Examiner*—George F. Lesmes
*Assistant Examiner*—Terrel Morris
*Attorney, Agent, or Firm*—Lorusso & Loud

[57] ABSTRACT

This invention relates to an antistatic mat, for example, a chair mat used for computer operation, a floor mat to be used at a room door, in an elevator or in front of an elevator door, and a car floor mat, and more particularly relates to an antistatic mat which is capable of instantly discharging the static electricity charged on a human body, removing a disagreeable sensation which is occasionally generated by the discharging of the static electricity.

5 Claims, 5 Drawing Sheets

ANTISTATIC MAT

FIELD OF THE INVENTION

This invention relates to an antistatic mat, for example, a chair mat used for computer operation, a floor mat to be used at a room door, in an elevator or in front of an elevator door, and a car floor mat, and more particularly relates to an antistatic mat which is capable of instantly discharging the static electricity charged on a human body, removing a disagreeable sensation which is occasionally generated by the discharging of the static electricity.

BACKGROUND OF THE INVENTION

There has been an antistatic mat disclosed in Japanese unexamined patent publication No. 2-14936/90 of the present inventor.

As is shown in FIG. 15, said antistatic mat 1 comprises a backing layer 3 which is formed on the back of a base material 2 through which pile 4 is driven, wherein a sheet of discharging paper 5, from which conductive fibers 8 made of conductive material such as carbon are protruding, is adhered to at least one side of said base material.

As the physical strength of said discharging paper 5 of said antistatic mat 1 is extremely low, the discharging paper 5 is reinforced with an adhesive layer 9.

In the antistatic mat disclosed in said unexamined patent publication wherein a discharging paper is adhered onto the top surface of the base material, said pile is driven through said base material from the side of said discharging paper, tending to destroy the discharging performance of said discharging paper.

In an antistatic mat wherein a discharging paper is adhered onto the bottom surface of the base material, an adhesive layer is fully adhered over the base material in order to reinforce the discharging paper, resulting in the impairment of the discharging performance of the antistatic mat.

In addition, this antistatic mat does not possess enough retaining capacity of static electricity, which is necessary to discharge the static electricity from a human body by earthing the static electricity on a human body.

Therefore, it has not been possible with the above described antistatic mat to completely remove the electrical shock to a human body which is caused by static electricity generated, for example, in a car.

Accordingly, it is an object of the present invention to provide an antistatic mat which completely and instantly removes the static electricity charged on a human body, resulting in the removal of a disagreeable sensation which is caused by the discharge of static electricity.

SUMMARY OF THE INVENTION

The invention is characterised by comprising a backing layer formed on the bottom side of the base material, a sheet of discharging paper containing conductive fibers made of conductive material which are partly protruding from said discharging paper which is partly adhered onto the bottom side of said base material to produce space between said base material and said discharging paper and pile which includes conductive fibers driven through said discharging paper and said base material.

The invention is further characterised by comprising a conductive layer including conductive material which is formed all over or partly over the bottom side of the discharging paper.

The invention is further characterised by comprising a conductive fabric including conductive fibers, which is formed on or within the backing layer on the bottom side of the discharging paper so as to contact with said conductive fibers in said pile.

Lastly, the invention is further characterised by comprising a backing layer including conductive fibers of conductive material such as carbon.

The present invention is described in detail in the following with the help of the accompanying drawings.

Figure 1:
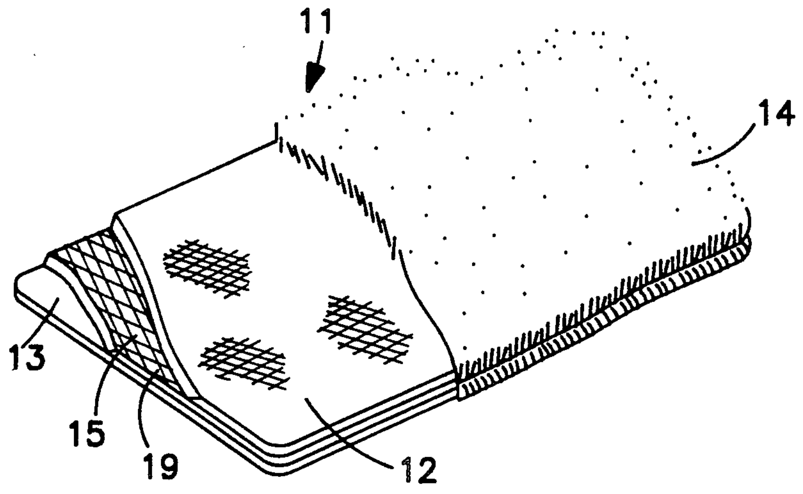
FIG. 1 is a perspective view of an antistatic mat of the present invention.
Figure 2:
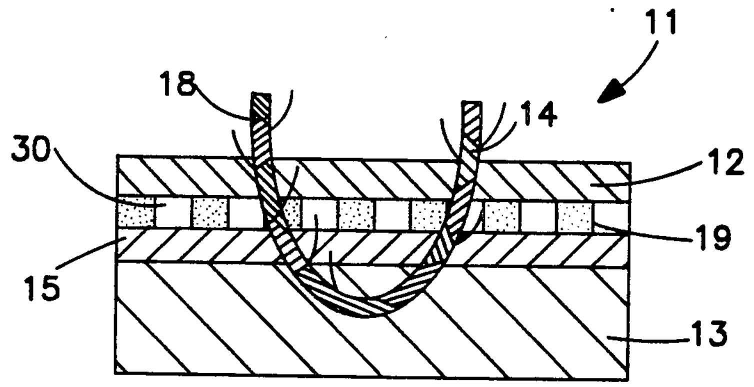
FIG. 2 is a fragmentary enlarged cross sectional view of the antistatic mat of FIG. 1.

The base material 12 of an antistatic mat of the present invention as shown in FIGS. 1 and 2 is made by cutting to a predetermined size and shape a sheet of porous material such as mesh material or polyamide material. As shown in FIG. 2, pile 14 is driven through the base material 12 and the discharging paper 15 in a shape of U.

The pile 14 comprises synthetic fibers of electrically nonconductive material, such as polyamide fibers, covering all over the top surface of an antistatic mat 11 so as to easily get electrically charged. The pile 14 includes conductive fibers 18 so as to discharge the static electricity charged on a human body by the contact of the human body with the surface of the mat.

There are two types of piles 14, one comprising only synthetic fibers and the other comprising synthetic fibers including conductive fibers 18. Said base material 12 has these two types of piles 14 driven.

It is preferred to prepare conductive fibers 18 including piles 14 by bundling conductive fibers 18 made of conductive material, such as carbon, ceramics and metal, together with synthetic fibers and then twisting them to a predetermined thickness. It seems that the static electricity charged in the pile(s) 14 is conducted to the discharging paper 15 through the conductive fibers 18. It is not always necessary to use both types of piles together. It is possible to singly use pile 14 including conductive fibers 18.

A sheet of discharging paper 15 is partly adhered to the bottom surface of the base material 12 of an antistatic mat.

The discharging paper 15 has part of the conductive fibers, which are included in the discharging paper, protrude from the surface of the discharging paper. The discharging paper, as disclosed in Japanese unexamined patent publication No. 62-156395, is preferred to comprise based on the total weight of the discharging paper 3–15 w % of conductive fibers made of such conductive material as carbon, metal and conductive ceramics, 20–70 w % of synthetic fibers such as polyester fibers and the remainder being wood pulp and adhesive. The thickness for both a conductive fiber and a synthetic fiber is preferred to be 1–5 deniers and the length for the same is preferred to be 3–6 mm. The discharging paper 15 is made by mixing such aforementioned materials which are prepared within said ratios and smashing the mixture into finer and evenly distributed mixture in a smasher and then is formed by wet paper making. The discharging paper made in such a way has more than 50 conductive fibers protruding vertically or slantly at random per square centimeter (not shown) of the paper surface. The static electricity conducted through the conductive fibers 18 of the pile 14 is then discharged into the air.

Between said discharging paper 15 and said base fabric 12 is placed adhesive 19 applied in dots or like a net or lines or circles and the discharging paper 15 and the base fabric 12 are partly adhered.

When the discharging paper 15 and the base fabric 12 are partly adhered by adhesive 19, adhered parts and non-adhered parts are made between the discharging paper 15 and the base babric 12. The adhered parts prevent the discharging paper 15 from falling off the base fabric 12 and the non-adhered parts create space 30 between the discharging paper 15 and the base fabric 12.

It seems that the antistatic mat 11 discharges the static electricity charged on a human body in such a way that the charged static electricity on the human body is earthed to the pile 14 of the mat 11 when the human body contacts the mat 11 and the static electricity charged on the pile 14 is conducted to the discharging paper 15 through the conductive fibers 18 which are included in the pile 14, and then the static electricity is discharged into the air from the protruding conductive fibers (not shown) of the discharging paper 15 through the space 30 formed between the base fabric 12 and the discharging paper 15.

A conductive layer 20 is formed on the bottom surface of the discharging paper 15 in the antistatic mat.

Figure 3:
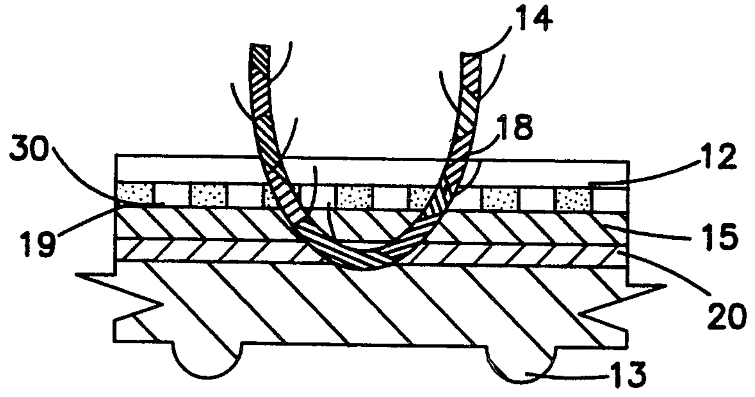
FIG. 3 is a fragmentary enlarged cross sectional view of an antistatic mat with a conductive layer.
Figure 4:
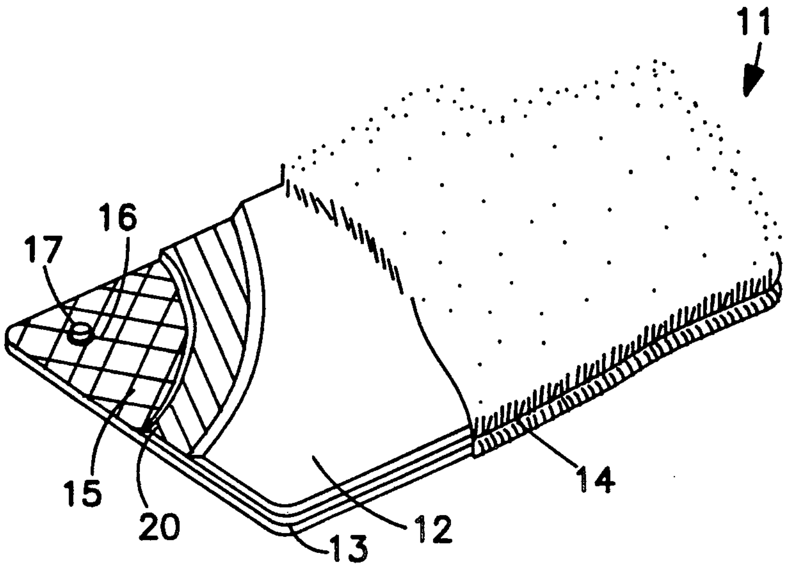
FIGS. 4 and 5 are perspective views showing embodiments of the conductive layers in the antistatic mat of FIG. 3.
Figure 5:
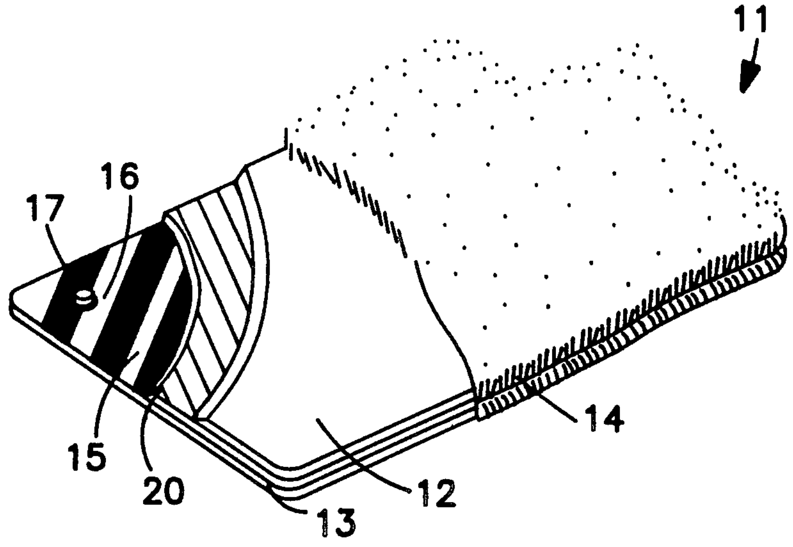

As shown in FIG. 3, the conductive layer 20 is a layer comprising conductive material such as carbon, conductive ceramics, metal and the like made into fibers or powder and mounted all over or partly on the bottom surface of the discharging paper 15. Two examples for forming a conductive layer 20 partly on the bottom surface of the discharging paper 15 are shown in FIGS. 4 and 5 with the conductive layer 20 formed on the bottom surface of the discharging paper 15 like a net or stripes. When the conductive layer 20 is formed, the static electrically charged on the pile 14 is conducted to the conductive layer 20 through the conductive fibers 18 which are included in the pile 14 and is retained in the conductive layer 20. Accordingly, it seems that the increase in retaining capacity of static electricity of the antistatic mat 11 improves the earthing performance of the static electricity charged on a human body.

The antistatic mat 11 has a conductive fabric 50 including conductive fibers on or in the backing layer on the bottom surface of the discharging paper 15, contacting the conductive fibers 18 of the pile 14.

The conductive fabric 50, which possesses flexibility and goes well with the base fabric 12, the discharging paper 15 and the backing layer 13, has conductive fibers formed in a pattern of check, web or twigs. When the conductive fabric 50 is as roughly woven as a surgeon's gauze, the backing layer gets impregnated into the conductive fabric 50 and therefore there is no fear of exfoliation. Any kind of conductive fiber can be utilized to make a conductive fabric as long as it possesses conductivity and the conductive component is exposed or protruding from the surface of the conductive fabric and also as long as it is capable of contacting electrically with said fibers 18 and capable of retaining the static electricity conducted through said fibers 18 in contacting with the conductive fibers 18 of said pile 14. The conductive fabric 50 is preferred to comprise conductive fibers of aromatic polyamide, for example, poly-p-phenylene terephthal amide plated with copper or chrome and woven in a pattern of check, which shows an excellent conductivity and resisitivity against stretching and heat. As for the size of a conductive fabric 50 in propotion to an antistatic mat, not only the one shown in FIG. 1 but also the one shown in FIG. 7 which is formed around the ring 16 installed to prevent the antistatic mat 11 from slipping can be utilized.

In the antistatic mat 11 comprising such as described above, the static electricity charged on a human body is earthed to the pile 14 of the mat 11 by contacting the mat 11, and the static electricity charged on the pile 14 is conducted to the conductive fabric 50 through the conductive fibers 18 in the pile, and is retained in the conductive fabric 50. It seems that the static electricity charged on the conductive fabric 50 is discharged from the conductive fibers protruding from the surface of the discharging paper 15 on the conductive fabric 50 through the space 30 created between the base fabric 12 and the discharging paper 15.

In order to prevent the antistatic mat 11 from moving around on the floor, a ring 16 can be installed on the rim part of the mat 11 by piercing, which is then hooked on a hook 17 made of conductive material such as iron and copper, and said conductive fabric 50 is connected to the ring 16. In this case, the static electricity retained in the conductive fabric 50 is earthed to the floor through the ring 16 and the hook 17, and the static electricity removal rate (the rate for discharging static electricity from the mat into the air) can be greatly improved.

Figure 8:
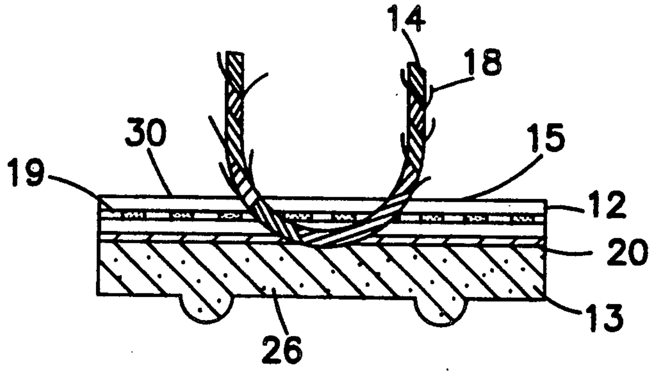
FIG. 8 is a fragmentary enlarged cross sectional view of an antistatic mat with a backing layer containing conductive fibers.

The backing layer 13 of the antistatic mat 11 of as shown in FIG. 8, comprises thermoplastic resin such as vinyl chloride including conductive fibers such as carbon fibers and also plastic materials, and said conductive fibers 26 are distributed evenly in the backing layer 13 so as to contact one another. In this case, it seems that besides the conductive layer 20, as the backing layer 13 possesses conductivity, part of the static electricity charged in the pile 14 is transfered to the baking layer 13 through the conductive fibers 18 of the pile 14. As a result, it seems that the static electricity retaining capacity of the antistatic mat 11 of the present invention is further improved and the charged voltage on a human body is further lowered. In the backing layer 13 of the antistatic mat 11 of the present invention, it seems that with part of the conductive fibers 26 included in the backing layer 13 protruding from the surface of the backing layer 13, the static electricity charged in the backing layer 13 is discharged into the air from the conductive fibers protruding from the surface of the backing layer 13.

Further, conductive fibers and conductive materials made of iron or copper fibers or powder which are to be included singly or in combination in said pile 14, discharging paper 15, conductive layer 20, conductive fabric 50 and backing layer 13 possess not only conductivity but also antibacterial property, and by using such materials, propergation of microorganisms is prevented or suppressed, preventing damage to the appearance of the antistatic mat and bad smell from generation.

Figure 9:
FIGS. 9–13 are fragmentary enlarged cross sectional views showing the processes for making an antistatic mat of the present invention.

As shown in FIG. 9, a base fabric 12 of porous sheet comprising such material as nonwoven fabric, mesh, polyamide fabric is cut to a predetermined size and about 30 g/m$^2$ of adhesive 19 is applied partly in dots or like a net, lines or circles. Any kind of adhesive may be used, however, thermoplastics such as polyethylen, polyamide, polyethylen terephthalate, polybuthylene terephthalate, polypropylene and polyvinyl chloride are particularly preferable. Resin which is excellent in heat adhesion such as polyethylene is especially preferable and performing it in a pattern of a net and placing the adhesive net on a base fabric 12 saves time and trouble in production by simplifying the manufacturing process. It is also considered useful for improvement of conductivity of the discharging paper 15 to add conductive substances such as carbon, metals and conductive ceramics to the adhesive 19.

Figure 10:
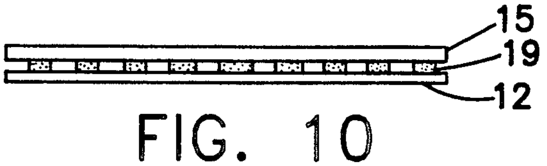

Next, as shown in FIG. 10, a discharging layer 15 is placed and partly adhered onto the adhesive 19 shaped in dots, stripes or the like on the base fabric 12.

Figure 11:
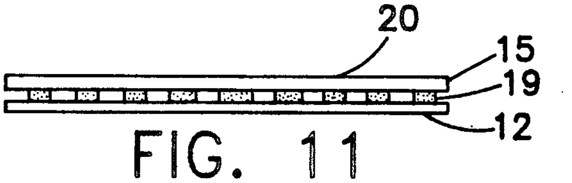

It is possible to form a conductive layer 20 on the side of the discharging paper 15 in order to improve the static electricity retaining power of an antistatic mat as shown in FIG. 11. A conductive layer 20 may be made by mixing conductive fibers or powder with an adhesive and applying the mixture onto the bottom surface of a discharging paper 15, or by first applying an adhesive on the bottom surface of a discharging paper 15 and distribute said conductive fibers or powder over the surface. The adhesive to be used for a conductive layer 20 may be the same adhesive 19 used for the adhesion of said base fabric 12 and said discharging paper 15. It is preferred to include at least 1 w % of conductive material in an adhesive of 30 g per m$^2$ of a discharging paper 15. Less than 1 w % of conductive material included in an adhesive is not efficient enough to give a good static electricity retaining power to a conductive layer 20.

Figure 12:
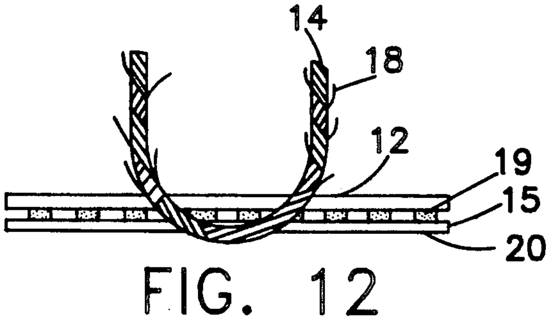

As described above, pile 14 is driven into a base fabric 12, a discharging paper 15 and a conductive layer 20 from the side of the base fabric 12 through the conductive layer 20 in a shape of U, as shown in FIG. 12, after adhering the discharging paper 15 partly on the base fabric 12 or after partly adhering the discharging paper 15 on the base fabric 12 and forming a conductive layer 20 on the bottom surface of the discharging paper 15.

Figure 13:
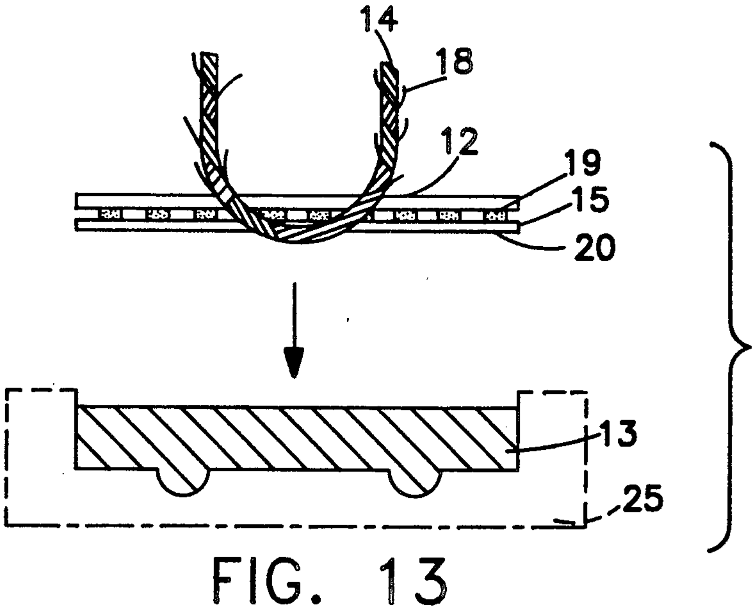

Next, as shown in FIG. 13, a base fabric 12 with said pile 14 driven into is placed on the solated synthetic resin such as polyvinyl chloride applied over a mold 25, then said resin is semisolated by heating the mold and said resin is impregnated into the base fabric 12, a discharging paper 15 and a conductive layer 20. It is better to impregnate said resin not to fill up the gap between the base fabric 12 and the discharging paper 15. It is also possible to mount a conductive fabric 50 made by weaving conductive fibers in a pattern of check or web on the resin sol comprising thermoplastics such as vinyl chloride resin, to mount the base fabric 12 with pile 14 driven into on said conductive fabric 50, to heat the mold 25, to semigelate the resin sol and to impregnate the resin into the base fabric 12, the discharging paper 15, the conductive layer 20 and the conductive fabric 50. The resin is hardened by cooling the mold 25 to form a backing layer 13 to be used in an antistatic mat.

It is also acceptable to add conductive fibers such as carbon fibers to a synthetic resin to be applied on the surface of a mold 25 in order to improve the static electricity retaining power of said backing layer 13. The resin sol containing said conductive fibers to be evenly distributed by adding a plasticizer is applied on the surface of the mold 25. For this, it is preferred to add at least 2 w % of conductive fibers in the total weight of the resin, because if the amount of conductive fibers is less than 2 w %, it is hard to to get sufficient static electricity retaining power by keeping the fibers in contact with one another.

PREFERRED EMBODIMENT

There is given detailed description of several embodiments of the present invention in the following.

EMBODIMENT 1

ANTISTATIC MAT: Consisting as in FIG. 2.

An adhesive is applied in dots. Size: $0.50\times0.74=0.37$ m$^2$ [Base fabric: nonwoven polyester fabric. Pile: polyamide fiber (1600 deniers) Conductive fiber to be included in pile: SANDERON (Nihon Sanmo Senshoku Inc.) Discharging paper: SOLDION (Toray Co., Ltd.) Adhesive to adhere discharging paper and base fabric: polyamide adhesive]

The charged voltage (1) in a human body was taken.

Figure 14:
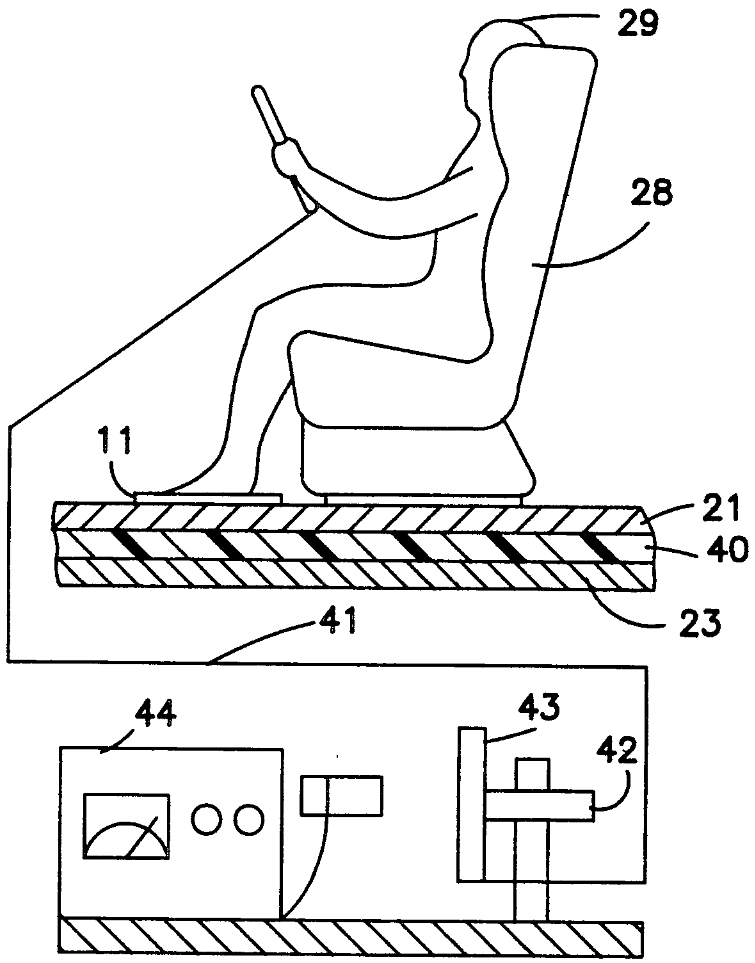
FIG. 14 is a fragmentary side sectional view figuring an apparatus to measure the static electricity charged on a human body.

Measurement apparatus: As is shown in FIG. 14, an insulation sheet 40 was placed on an aluminum floor 23 and a carpet 21 made of polyamide was spread, and a chair 28 and the antistatic mat 11 were put on the carpet 21.

A person 29 sat on the chair 28 with his feet touching the antistatic mat 11. He rubbed his back and hip ten times against the chair 28. The charged static electricity was transferred to the potential meter 44 through an aluminum board 43 attached to a lead 41 and an insulation rod 42 and the voltage was taken. The temperature was 20° C. and the humidity was 20%.

Table 1 shows the result.

EMBODIMENT 2

ANTISTATIC MAT: Consisting as in FIG. 3.

An adhesive was applied in dots. Size: $0.50\times0.74=0.37$ m$^2$

[Base fabric: nonwoven polyester fabric. Pile: polyamide fiber (1600 deniers) Conductive fiber to be included in pile: SANDERON (Nihon Sanmo Senshoku Inc.) Discharging paper: SOLDION (Toray Co., Ltd.) Adhesive to adhere discharging paper and base fabric: polyamide adhesive Conductive layer: (carbon powder and polyamide adhesive) formed all over base fabric. The amount of (carbon powder and polyamide adhesive) was 30 g/m$^2$ of the discharging paper and the amount of carbon powder included was 0.6 g.]

The charged voltage (2) in a human body was taken. Table 1 shows the result.

EMBODIMENT 3

Figure 6:
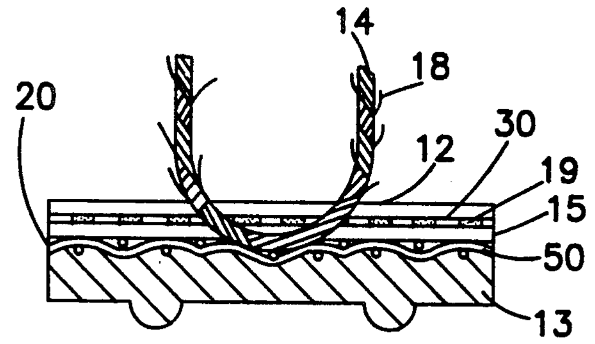
FIG. 6 is a fragmentary enlarged cross sectional view of an antistatic mat with a conductive fabric.

ANTISTATIC MAT: Consisting as in FIG. 6.

An adhesive was applied in dots and a conductive fabric about the size of the conductive paper was mounted on the bottom side of the conductive paper. Size: 0.50×0.74=0.37 $m^2$ [Base fabric: nonwoven polyester fabric. Pile: polyamide fiber (1600 deniers) Conductive fiber to be included in pile: SANDERON (Nihon Sanmo Senshoku Inc.) Discharging paper: SOLDION (Toray Co., Ltd.) Adhesive to adhere discharging paper and base fabric: polyamide adhesive Conductive layer: (carbon powder and polyamide adhesive) formed all over base fabric. The amount of (carbon powder and polyamide adhesive) was 30 g/$m^2$ of the discharging paper and the amount of carbon powder included was 0.6 g.] Conductive fabric: poly-p-phenylene terephthal amide fiber plated with copper and chromed conductive fibers (200 deniers) interwoven into plain fabric like a sergeon's gauze. Overlocking yarn: yarn including conductive fibers 100 d×2/inch]

The charged voltage (2) in a human body was taken. The measurement was conducted for the case when no earthing took place between said antistatic mat and the floor (3A), for the case when earthing took place through a ring (3B) and for the case when earthing took place through the overlock on the rim of said antistatic mat (3C).

Table 1 shows the result.

EMBODIMENT 4

Figure 7:
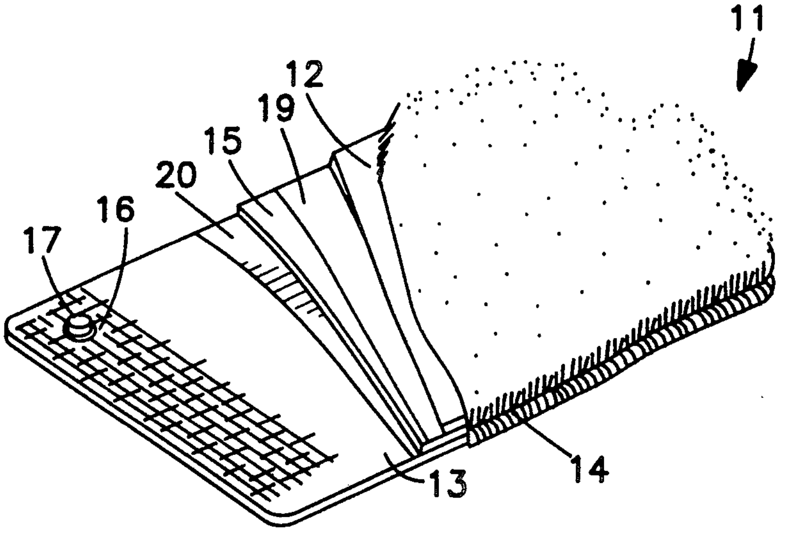
FIG. 7 is a perspective view of another embodiment.

The measurement was conducted in the untistatic mat, consisting the same as in Embodiment 3 except the conductive fabric which was the same size as in FIG. 7, in the same manner as in Embodiment 3 for the case when no earthing took place from a human body (4A), for the case when earthing took place through a ring (4B) and for the case when earthing took place through the overlock on the rim of said antistatic mat (4C).

Table 1 shows the result.

EMBODIMENT 5

ANTISTATIC MAT: Consisting as in FIG. 8.

An adhesive was applied in dots and a conductive fabric about the size of the conductive paper was mounted on the bottom side of the conductive paper. Size: 0.50×0.74=0.37 $m^2$ [Base fabric: nonwoven polyester fabric. Pile: polyamide fiber (1600 deniers) Conductive fiber to be included in pile: SANDERON (Nihon Sanmo Senshoku Inc.) Discharging paper: SOLDION (Toray Co., Ltd.) Adhesive to adhere discharging paper and base fabric: polyamide adhesive Conductive layer: (carbon powder and polyamide adhesive) formed all over base fabric. The amount of (carbon powder and polyamide adhesive) was 30 g/$m^2$ of the discharging paper and the amount of carbon powder included was 0.6 g. Backing layer: (mixture of vinyl chloride resin powder and carbon fibers (5 mm in length) and plasticizer) mixed evenly.]

The charged voltage (5) in a human body was taken. Table 1 shows the result.

COMPARISON 1

Figure 15:
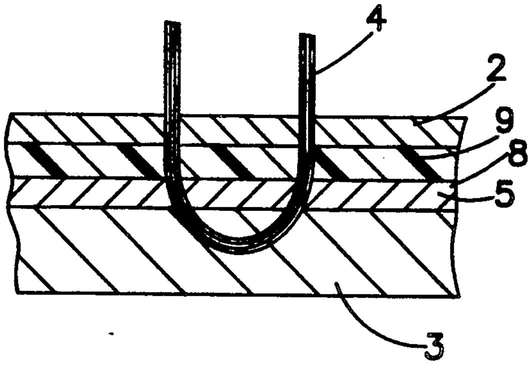
FIG. 15 (PRIOR ART)
FIG. 15 is a fragmentary enlarged cross sectional view of a conventional antistatic mat.

ANTISTATIC MAT: Consisting as in FIG. 15.

An adhesive was applied in dots and a conductive fabric about the size of the conductive paper was mounted on the bottom side of the conductive paper. Size: 0.50×0.74=0.37 $m^2$ [Base fabric: nonwoven polyester fabric. Pile: polyamide fiber (1600 deniers) conductive fiber to be included in pile:

SANDERON (Nihon Sanmo Senshoku Inc.) Discharging paper: SOLDION (Toray Co., Ltd.) Adhesive to adhere discharging paper and base fabric: polyamide adhesive.]

The charged voltage (6) in a human body was taken as in EMBODIMENT 1.

Table 1 shows the result.

TABLE 1

| | CHARGED VOLTAGE WITHOUT CONTACT WITH MAT (KV) | CHARGED VOLTAGE WITH CONTACT WITH MAT (KV) | REMOVAL RATE (%) |
|---|---|---|---|
| 1 | 8.1 | 3.1 | 61.8 |
| 2 | 10.0 | 2.3 | 77.0 |
| 3A | 10.0 | 2.2 | 78.0 |
| 3B | 10.0 | −2.5 | |
| 3C | 10.0 | −2.7 | |
| 4A | 10.0 | 2.1 | 79.0 |
| 4B | 10.0 | −1.3 | |
| 4C | 10.0 | −1.6 | |
| 5 | 10.0 | 2.0 | 80.0 |
| 6 | 8.4 | 4.3 | 48.8 |

As can be seen from Table 1, about 50% of the static electricity was removed according to Comparison 1, however, it was not enough to remove ill effects of static electricity. On the other hand, the antistatic mat of Embodiment 1 lowered the charged voltage to 3.1 kv, which was enough to remove the ill effects of static electricity.

According to the experiments by the inventor, it was found that when the static electricity charged on a person is lowered below 3.0 kv by discharging the static electricity through an antistatic mat, there is no electrical shock to a person. The antistatic mat of Embodiment 2 realized 2.3 kv, well below 3.0 kv. The antistatic mat of Embodiment 3 realized 2.2 kv when there was no earthing (3A). When earthing from the ring took place (3B), it was −2.5 kv, and when earthing from the overlock took place (3C), it was −2.7 kv, both of which were surprisingly low. In the antistatic mat of Embodiment 4, as in the antistatic mat of Embodiment 3, the result was 2.1 kv (4A), −1.3 kv (4B) and −1.6 kv (4C). In the antistatic mat of Embodiment 5, it was 2.0 kv.

Accordingly the antistatic mat 11 instantly removes the static electricity charged on a human body and therefore removes unpleasantness that would be caused by the discharging of the static electricity mainly at the times of getting on and off a car.

The antistatic mat 11 is capable of ataining charged static electricity of 2.3 kv, helped by a conductive layer.

The antistatic mat 11 enables the sharp increase of the static electricity retaining power by placing a conductive fabric on or in the backing layer, ataining charged electricity of −2.7 kv, perfectly removing the static electricity charged on a human body.

The antistatic mat 11 further increases the static electricity retaining power by giving the backing layer a function to retain static electricity.

I claim:

1. An antistatic mat comprising:

a base fabric, a discharging paper comprising conductive and synthetic fibers, wherein said conductive fibers partly protrude from the surface, which is partially adhered to said base fabric creating space between said discharging paper and said base fabric;

a backing layer formed at a side of the discharging paper opposite the base fabric, and;

pile including conductive fibers driven through said base fabric, said discharging paper and said backing layer.

2. The antistatic mat as set forth in claim 1, wherein a conductive layer including conductive material or materials is formed in situ on said discharging paper thereby adhesively connecting said discharging paper to said backing layer.

3. The antistatic mat as set forth in claim 1, wherein a conductive fabric including conductive fibers is distributed on or in a backing layer on the back of said discharging paper so as to contact the conductive fibers of said pile.

4. The antistatic mat as set forth in claim 1, wherein said backing layer includes conductive fibers.

5. The antistatic mat as set forth in claim 1, wherein said discharging paper is partially adhered to said base fabric by an adhesive means having conductive materials contained therein.

* * * * *